United States Patent [19]

Negrin

[11] Patent Number: 5,586,815
[45] Date of Patent: Dec. 24, 1996

[54] METHOD AND SYSTEM FOR DETECTING FALSE FOUR-WHEEL DRIVE INDICATION IN ANTILOCK BRAKE SYSTEMS

[75] Inventor: Dan Negrin, Wiesbaden, Germany

[73] Assignee: Kelsey-Hayes Company, Livonia, Mich.

[21] Appl. No.: 303,389

[22] Filed: Sep. 9, 1994

[51] Int. Cl.$^6$ ............................................. B60J 8/00
[52] U.S. Cl. ................................ 303/143; 303/190
[58] Field of Search .......................... 303/91, 95, 100, 303/93, 110, 113.1, 113.2, 113.3, 143, 170; 180/197, 249, 244; 364/184, 426.02

[56] References Cited

U.S. PATENT DOCUMENTS

| | | | |
|---|---|---|---|
| 4,589,511 | 5/1986 | Leiber | 353/100 |
| 4,702,337 | 10/1987 | Burckhardt et al. | 303/93 |
| 4,753,312 | 6/1988 | Burgdorf et al. | 303/113.3 |
| 4,759,590 | 7/1988 | Uchida et al. | 303/100 |
| 5,170,343 | 12/1992 | Matsuda | 364/184 |
| 5,197,566 | 3/1993 | Watanabe et al. | 180/249 |

*Primary Examiner*—Matthew C. Graham
*Attorney, Agent, or Firm*—Brooks & Kushman P.C.

[57] ABSTRACT

A method and system for detecting an incorrect indication of front-rear locked four-wheel drive operation of a vehicle capable of both front-rear locked four-wheel drive and unlocked two-wheel drive. The relative speed difference, defined as the absolute value of the difference between the rear wheel velocity and the arithmetic average of the front wheel velocities divided by the vehicle reference speed, is measured repeatedly. A count of measured relative speed differences greater than a relative speed threshold is calculated. The incorrect indication is detected when the count exceeds a rejection threshold. The relative speed threshold is predetermined based on histograms of relative speed data for two-wheel drive and four-wheel drive modes of operation. Once an incorrect indication is detected, modifications are made to the antilock brake system control algorithm.

27 Claims, 2 Drawing Sheets

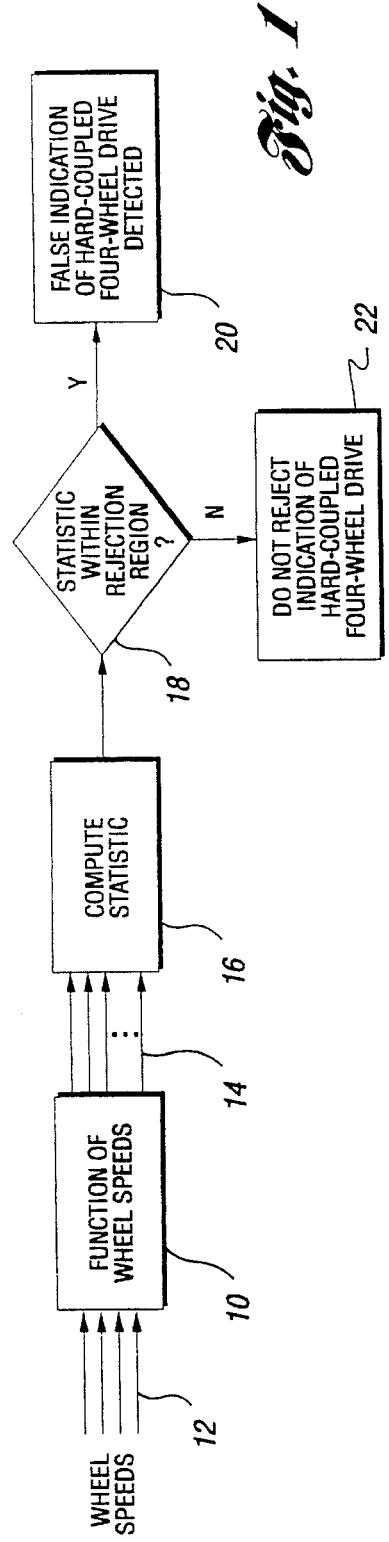
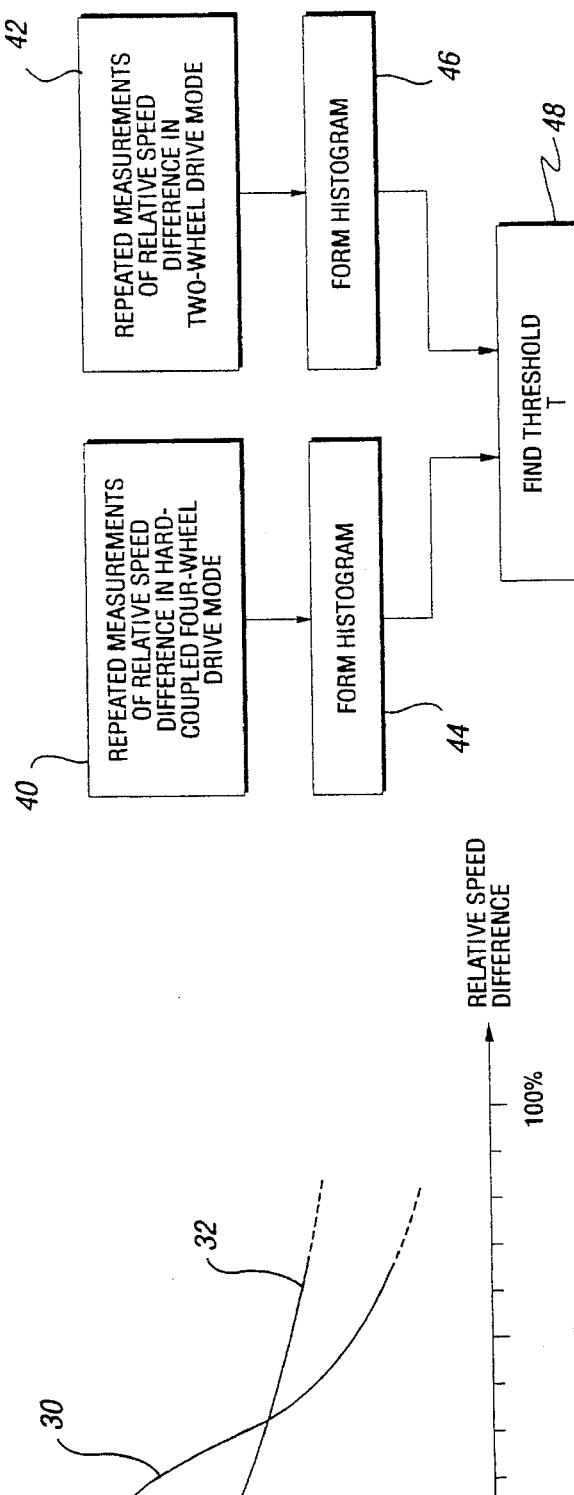
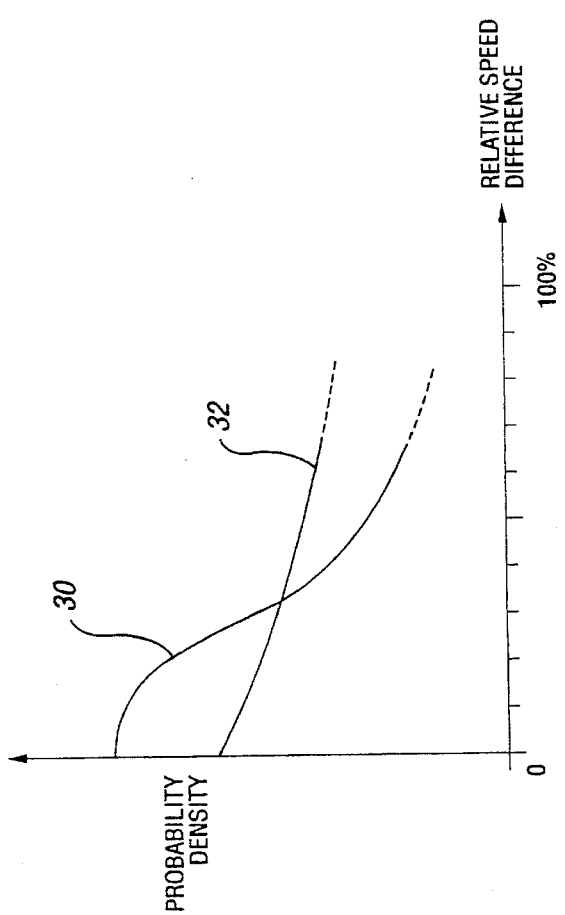

METHOD AND SYSTEM FOR DETECTING FALSE FOUR-WHEEL DRIVE INDICATION IN ANTILOCK BRAKE SYSTEMS

TECHNICAL FIELD

This invention relates to antilock brake systems, and more particularly, to antilock brake systems used in vehicles capable of both hard-coupled four-wheel drive operation and uncoupled two-wheel drive operation.

BACKGROUND ART

The objective of an antilock brake system (ABS) in a vehicle is to reduce the brake pressure in the different wheel brakes in case of excessive braking so that the wheels generate maximum brake force without locking. This aids in retaining vehicle stability and steerability while providing shorter stopping distances.

In vehicles capable of both hard-coupled four-wheel drive or uncoupled two-wheel drive operation, and having antilock brake systems, the braking control characteristic of the ABS procedure is highly dependent on the mode of operation utilized in the drivetrain. This dependence results, in part, from the inherent differences in stability, steerability, and stopping distance between two-wheel and four-wheel drive operation. For example, the four-wheel drive mode inherently provides improved braking ability (i.e. shorter stopping distances). However, the four-wheel drive mode produces degraded cornering ability under lock-up conditions compared to the two-wheel drive mode.

In some prior art four-wheel drive vehicle equipped with a standard ABS which controls the front and rear wheels independently, the torque inputs at the front and rear drive shafts may be unequal during braking due to the ABS independent modulation of the front and rear wheels. This causes torque interference and torsional vibration of the drive shafts and unanticipated torque transfer over the brake torque. Consequently, the following problems can occur, especially on slippery (or low-mu) driving surfaces:

(i) the reference wheel speed, which estimates the actual vehicle speed based on the four measured wheel speeds, can significantly underestimate the actual vehicle speed since all four wheels may lock together.

(ii) once the wheels experience high slippage, recovery of the wheels' speed to the vehicle speed becomes slow because of the greater moment of drivetrain inertia; and (iii) torsional vibration of the drive shafts occurs with independent modulation of the front and rear wheels and unanticipated torque transfer over the hydraulic brake torque.

Various solutions for modifying the ABS control algorithm due to the specific requirements of four-wheel drive operation have been proposed and implemented. However, the benefits gained by these modifications cannot be realized without an accurate indication of the mode of operation of the drivetrain.

Vehicles whose differentials can be either locked or free (thus providing either four-wheel or two-wheel drive) include means of indicating the commanded or intended mode of operation of the drivetrain. Such instrumentation is subsequently referred to as a drivetrain indicator. One example of a drivetrain indicator is a dashboard light which is "on" when the vehicle is commanded or intended to be in a four-wheel drive mode of operation and "off" for an intended two-wheel drive mode of operation. In such vehicles, an electrical or electro-optic sensor is used to determine the status of the dashboard-light drivetrain indicator, and this status is relayed to the antilock brake system. Another example of a drivetrain indicator is a flag variable within a software routine. Regardless of the form of the drivetrain indicator, the antilock brake system monitors this indicator and modifies its braking control algorithm in response to the intended mode of operation.

The major shortcoming of modifying the antilock brake system control algorithm based simply on monitoring the drivetrain indicator is that the actual mode of operation is not necessarily the same as the intended or commanded mode of operation. For example, a vehicle may be operating in an uncoupled two-wheel drive mode, and then commanded to operate in a hard-coupled four-wheel drive mode. In this example, the dashboard light could indicate the intent of hard-coupled four-wheel drive mode operation for a period of time before the drivetrain has indeed entered the hard-coupled state. Further, this indicator can yield false indications in vehicles with manually locking wheel hubs when the wheel hubs are unlocked.

The need exists for accurately determining whether a four-wheel drive mode of operation indicated by the drivetrain indicator is actually a false indication, so that characteristics of the ABS procedure can be modified for the actual two-wheel drive operation of the vehicle.

A crude method for detecting false four-wheel drive operation exists in prior art systems. The method requires both front wheels to be in slip with the rear not in slip for an extended period of time. Also, if the front departures are out of phase, this method will not detect false four-wheel drive operation.

DISCLOSURE OF INVENTION

It is thus a general object of the present invention to provide a method and system for determining if a vehicle drivetrain capable of hard-coupled four-wheel drive operation is operating in the hard-coupled four-wheel drive mode.

A further object of the present invention is to provide a method and system for determining if a vehicle drivetrain capable of hard-coupled four-wheel drive operation, with instrumentation indicating the vehicle drivetrain is in the hard-coupled four-wheel drive mode, is improperly operating in the hard-coupled four-wheel drive mode.

In carrying out the above objects and other objects and features of the present invention, there is provided a method for determining whether a vehicle drivetrain capable of hard-coupled four-wheel drive operation, with instrumentation indicating the vehicle drivetrain is in the hard-coupled four-wheel drive mode, is improperly operating in the hard-coupled four-wheel drive mode. The present invention statistically determines the validity of the four-wheel drive mode of operation given by the drivetrain indicator.

In further carrying out the above objects and other objects and features of the present invention, there is provided a method for detecting an incorrect indication of four-wheel drive operation of a vehicle is disclosed. The vehicle has a front axle with two front wheels and a rear axle with two rear wheels. The vehicle is capable of both four-wheel drive operation where the front and rear axles are locked together, and operation where the front and rear axles are unlocked. The vehicle also has an antilock brake system and means coupled to the antilock brake system for indicating four-wheel drive operation. The method comprises the steps of:

(a) generating a first speed signal representative of a speed of at least one wheel on the front axle;

(b) generating a second speed signal representative of a speed of at least one wheel on the rear axle;

(c) calculating a decision value based upon the first and second speed signals; and (d) detecting an incorrect indication that the vehicle is in four-wheel drive operation when the decision value is within a rejection region.

The advantages accruing to the present invention are numerous. For example, the accurate indication of the mode of operation of the vehicle results in improved antilock braking.

The above objects and other objects and features of the present invention will be readily appreciated by one of ordinary skill in the art from the following detailed description of the best mode for carrying out the invention when taken in connection with the accompanying drawings.

BRIEF DESCRIPTION OF DRAWINGS

FIG. 1 is a combination flow chart/block diagram representation of one embodiment of the present invention;

FIG. 2 illustrates two example histograms representing the relative speed difference distributions for the four-wheel drive and two-wheel drive modes;

FIG. 3 is a block diagram representation of the off-line threshold determination method for the present invention.

BEST MODE FOR CARRYING OUT THE INVENTION

Figure 4:
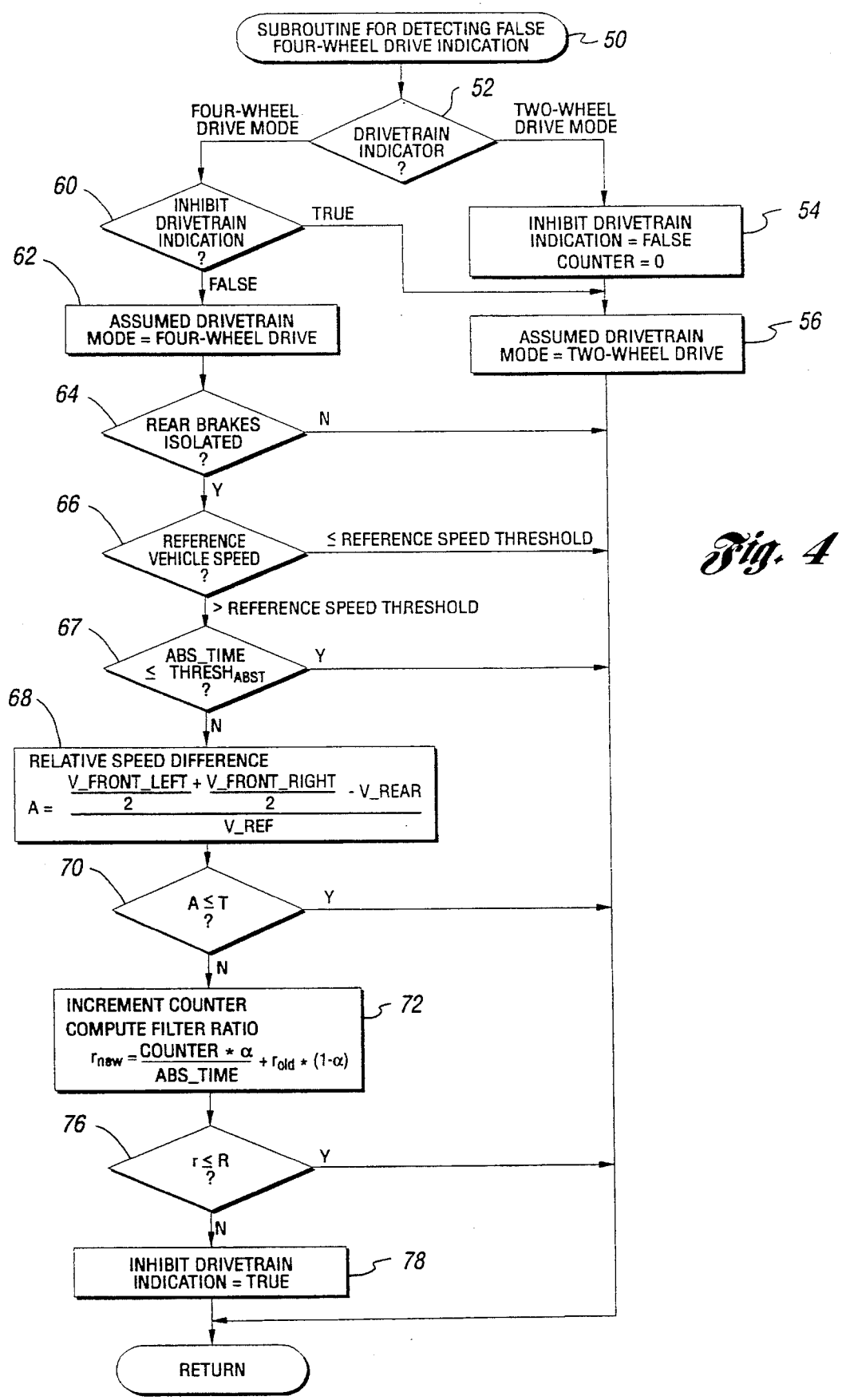
FIG. 4 is a flow chart representation of one embodiment of the present invention.

The methodology of the present invention exploits the difference in the statistical distribution of relative speed difference depending on whether the vehicle drivetrain is operating in a hard-coupled four-wheel drive mode or an uncoupled two-wheel drive mode. For purposes of this discussion, the relative speed difference is defined as the absolute value of the difference between the rear wheel velocity and the arithmetic average of the front wheel velocities divided by the vehicle reference speed. If this relative speed difference is repeatedly measured while the vehicle is operating in a four-wheel drive mode of operation, a first histogram that approximates a frequency distribution of relative speed differences can be formed. Similarly, if the relative speed difference is repeatedly measured while the vehicle is operating in a two-wheel drive mode of operation, another histogram can be formed that approximates a frequency distribution of relative speed differences. In the four-wheel drive mode of operation, the constraint imposed by the hard-coupling of the front and rear wheels causes the relative speed difference histogram to be more dense near zero than the histogram for the uncoupled two-wheel drive mode of operation. This difference in probability density near zero is exploited in forming the statistical decision criterion for determining the mode of operation of the vehicle.

A relative speed threshold T can be selected based on experimentally-determined histograms for each particular vehicle and drivetrain such that a relative speed difference greater than T indicates that it is more probable that the actual mode of operation is two-wheel drive rather than four-wheel drive. The proportion of time, or frequency, that two-wheel drive indications occur can then be calculated. If this proportion of time is greater than a rejection threshold R over a sufficient total time of collecting data, then evidence is deemed present to reject the dashboard indicator hypothesis that the vehicle is operating in the four-wheel drive mode. The two thresholds can be selected to reflect such objectives as expected response time for four-wheel drive hypothesis rejection and accuracy of four-wheel drive hypothesis rejection.

Referring now to FIG. 1, there is shown a block diagram of the main functions involved in the method of detecting false hard-coupled four-wheel drive indications according to the present invention. The method is executed when an indication of hard-coupled four-wheel drive mode is given by the drivetrain indicator. The speeds of the vehicle wheels are input to a function block 10 via vector input lines 12. Although four wheel speeds are indicated, one of ordinary skill in this art will recognize that other configurations are possible. For instance, one common configuration uses separate wheel speed signals for the front wheels of a vehicle and a single wheel speed indication for the rear wheels. At a minimum, however, one front wheel speed indication and one rear wheel speed indication is necessary.

The function block 10 shown in FIG. 1 computes a function of the measured wheel speeds, and outputs the present and all previous evaluations of the function along vector output lines 14. Lines 14 are input to a statistic computation block 16, which computes a statistic of the present and previous evaluations of the wheel speed function. The standard mathematical definition of statistic, being simply a function of random variables, is employed for the purpose of the present invention. As shown, the computed statistic is applied to a conditional block 18. Conditional block 18 determines whether the computed statistic is within a defined rejection region. If the statistic is within the rejection region, a false indication of hard-coupled four-wheel drive is detected, and control flow proceeds to block 20. Block 20 represents the detection of the false indication. If the statistic is not within the rejection region, block 22 indicates that the indication of hard-coupled four-wheel drive is not rejected.

The wheel speed function of block 10 used in the preferred embodiment is based upon a relative speed difference between the front and rear wheel speeds. The statistic of block 16 used in the preferred embodiment is a count of the evaluated relative speed differences that exceed a relative speed threshold R. The rejection region of block 18 used in the preferred embodiment is defined by values of the statistic greater than a rejection threshold T. These specificities should not be construed as limiting the scope of the invention, but as merely providing an illustration of the presently preferred embodiment of this invention.

With reference now to FIG. 2, there is shown two example relative speed difference histograms for the four-wheel drive 30 and two-wheel drive 32 modes of operation of a vehicle. As previously noted, the relative speed difference is defined as the absolute value of the difference between a rear wheel velocity indicator and a front wheel velocity indicator, divided by the vehicle reference speed. These wheel velocity indicators could be the arithmetic average of two or more wheel velocities, a single value if one sensor is used for a particular axle, or some other function of the respective wheel speeds. Since the motion of the front and rear wheels are constrained in the hard-coupled four-wheel drive mode of operation, its relative speed difference histogram 30 is more dense near zero than the relative speed difference histogram 32 for the uncoupled two-wheel drive mode, as shown.

Referring now to FIG. 3, there is shown a methodology for determining a relative speed threshold for use with the present invention. Before the implementation of the false four-wheel drive detection method in the antilock brake system, at step 40, repeated measurements of relative speed difference are taken when the vehicle is in the four-wheel drive mode. Similar measurements are taken at step 42 when the vehicle is in the two-wheel drive mode. Two histograms such as histograms 30 and 32, shown in FIG. 2, are found experimentally at steps 44 and 46, respectively, based on sufficiently large sets of relative speed difference data. A threshold determination calculation is performed at step 48 to select a relative speed threshold T based on the two histograms, such that a relative speed difference measured and computed after the implementation of the false four-wheel drive detection method greater than T indicates that the probability of an actual two-wheel drive mode of operation is greater than the probability of an actual four-wheel drive mode of operation.

A detailed flow chart of the subroutine used to implement the method is shown in FIG. 4. Typically, this subroutine would be repeatedly called within a main ABS routine during an ABS event (i.e. when the antilock brake system is required). After entering the subroutine at step 50, a dashboard indicator of the mode of operation (either four-wheel drive or two-wheel drive) is checked at step 52. The state of this indicator is based on the commanded mode of operation and the commanded mode of operation may not be the same as the actual mode of operation. For example, when a four-wheel drive mode of operation is commanded, the dashboard indicator immediately displays a four-wheel drive mode even though the vehicle may not have yet attained hard-coupled four-wheel drive operation. Once again, this possibility is the impetus of the method for determining statistically whether an inerrant indication of hard-coupled four-wheel drive operation is present.

With continuing reference to FIG. 4, if the dashboard indicator indicates a two-wheel drive mode, then an inhibit drivetrain indication of four-wheel drive flag is set to "false" at step 54. Additionally, a counter is set to zero. The counter is used to count the number of times the relative speed threshold is exceeded after repeated measuring of the relative speed difference. In other words, the counter counts the number of times two-wheel drive operation was more probable than four-wheel drive operation. After a sufficient number of relative speed differences is measured, the frequency of speed difference indications of actual two-wheel drive operation is calculated based on the counter.

For a sufficiently high frequency of these speed difference based two-wheel drive indications while the drivetrain indicator is indicating a four-wheel drive mode, the drivetrain indicator is overridden and the ABS operates according to a two-wheel drive control characteristic. At step 56, the current assumption of the drivetrain mode is set to two-wheel drive, and the subroutine is exited.

As shown in FIG. 4, if the drivetrain indicator displays a four-wheel drive mode, then the inhibit drive indication flag is checked at step 60. The inhibit drivetrain indication flag is used to provide means to ignore the dashboard indicator completely and employ ABS braking control for a two-wheel drive mode of operation. The inhibit flag is "true" if the dashboard indicator is to be ignored and two-wheel drive operation is to be assumed, whereas the flag is "false" if a dashboard indication of four-wheel drive operation is not to be immediately rejected. It will be shown further in the flow chart that the inhibit flag is set to "true" when all of the conditions for rejecting the hypothesis of four-wheel drive operation are met. If the inhibit flag is "true", then the assumed drivetrain mode is set to two-wheel drive at step 56 and the subroutine is exited. If the inhibit flag is "false", then the assumed drivetrain mode is set to four-wheel drive at step 62 and further conditions are tested.

For an assumed four-wheel drive drivetrain mode, at step 64 the status of rear isolation is checked. If the rear brakes are not isolated, the subroutine is exited. If, however, the rear brakes are isolated, the reference vehicle speed is examined at step 66. The reference vehicle speed, denoted by the variable V_REF, is an estimate of the actual vehicle speed that is typically calculated within the ABS algorithm. Various methods for calculating vehicle reference speed are employed in various antilock brake systems; however, it is noted that the method selected for calculating vehicle reference speed does not limit the operation of the present invention.

If the reference vehicle speed is less than or equal to some minimum threshold, then the subroutine is immediately exited. Otherwise, the amount of time in the current antilock brake system event is then checked in conditional block 67. The variable ABS_TIME provides a measure of the reduction in variability of the ratio of the counter divided by ABS_TIME. Since the value of this ratio forms the basis of the decision criterion for determining whether a false four-wheel drive indication is present, and since the standard deviation of the ratio is proportional to the reciprocal of the square root of ABS_TIME, it is apparent that a more confident decision can be made for larger values of ABS_TIME. If the amount of time ABS_TIME is less than or equal to a time threshold THRESH_ABST, then the subroutine is exited. If ABS_TIME is greater than the time threshold, then control flow proceeds to step 68.

The value of the relative speed difference is determined at step 68. The relative speed difference, denoted by the variable A, is a measure of the speed discrepancy between the front and rear wheels as a fraction of the vehicle reference speed. Shown as implemented in a three-wheel sensor ABS system, the front wheel speed is determined by finding the arithmetic average of the left front and the right front wheel velocities, i.e., the sum of V_FRONT_LEFT divided by two and V_FRONT_RIGHT divided by two. The speed difference between the front and rear wheels is found by subtracting the rear wheel velocity (V_REAR), from this arithmetic average of the front wheel velocities. The relative speed difference, A, is the quotient of the absolute value of this difference and the vehicle reference speed V_REF. In block 68, the speed discrepancy between the front and rear wheels as a fraction of vehicle speed is computed.

As shown in FIG. 4, control flow proceeds to step 70. If the relative speed difference is less than or equal to the threshold T, then the subroutine is exited. However, if the relative speed difference is greater than this threshold, then, based solely on this one piece of data, it is more probable that the actual mode of operation is two-wheel drive rather than the indicated four-wheel drive. Thus, the method proceeds to the step of determining the current value of the decision variable is performed.

In step 72, the counter is incremented to account for another speed difference reading indicating a more probable two-wheel drive mode of operation rather than the indicated four-wheel drive mode of operation. The new observed frequency of these speed difference readings, denoted by the variable $r_{new}$, is preferably calculated by dividing the product of a constant $\alpha$ and the counter by the amount of time in the current ABS event, denoted by the variable ABS_TIME, which is obtained from the main ABS routine. Then, this value is added to the old observed frequency of these speed difference readings, denoted by the variable $r_{old}$ multiplied by the constant $(1-\alpha)$.

With continuing reference to FIG. 4, if the value of the ratio r (i.e. $r_{new}$) in block 76 is less than or equal to the threshold R, then it is deemed that there is not a sufficiently high frequency of speed differences indicating a more probable two-wheel drive mode of operation to reject the hypothesis of the four-wheel drive mode of operation given by the dashboard indicator. At this point, the subroutine is exited. If, however, the value of the ratio r is greater than the threshold R, then the hypothesis of four-wheel drive mode of operation given by the dashboard indicator is rejected. At step 78, the inhibit drivetrain indication flag is set to "true", indicating that the dashboard indicator is producing an errant output and that it should be ignored as long as it is indicating a four-wheel drive mode of operation. Parameters of the ABS can then be modified in response to the realization that the vehicle is actually operating in the two-wheel drive mode. For example, a more aggressive braking characteristic, such as an aggressive pressure reapplication, may be utilized by the ABS algorithm after detecting a false indication of hard-coupled four-wheel drive.

In the statistic computation block 72, the filtered ratio r is computed based on the time that A>T to the time in ABS where $\alpha$ is a constant less than 1. Filtering smoothes the progression of the ratio, thus improving the accuracy of four-wheel drive hypothesis rejection.

The method and system of the present invention could also be used to distinguish hard-coupled four-wheel drive operation from soft-coupled four-wheel drive operation (also known as all-wheel drive). In this example, the two relative speed difference histograms would be formed based on hard-coupled four-wheel drive operation and all-wheel drive operation, respectively. The relative speed threshold would then be formed based on these histograms. One with ordinary skill in the art will recognize that the method and system could also be used to detect an incorrect indication of two-wheel drive. In this instance, the counter is incremented when the relative speed difference is less than a threshold.

It is understood that the while the forms of the invention herein shown and described constitute the preferred embodiments of the invention, they are not intended to illustrate all possible forms thereof. It will also be understood that the words used herein are words of description rather than words of limitation, and that various changes may be made without departing from the spirit and scope of the invention as disclosed.

What is claimed is:

1. A method for detecting an incorrect indication of four-wheel drive operation of a vehicle, the vehicle having a front axle with two front wheels and a rear axle with two rear wheels, the vehicle capable of both four-wheel drive operation where the front and rear axles are locked together and operation where the front and rear axles are unlocked, the vehicle further having an antilock brake system and means coupled to the antilock brake system for indicating four-wheel drive operation, the method comprising the steps of:

(a) generating a first speed signal representative of a speed of at least one wheel on the front axle;

(b) generating a second speed signal representative of a speed of at least one wheel on the rear axle;

(c) calculating a decision value based upon the first and second speed signals; and (d) detecting an incorrect indication that the vehicle is in four-wheel drive operation when the decision value is within a rejection region.

2. The method of claim 1 wherein steps (a), (b), (c), and (d) are repeated.

3. The method of claim 2 wherein the step of calculating includes the steps of:

measuring at least one value of a first function of the first and second speed signals; and computing the decision value based upon a statistic of the measured value of the first function.

4. The method of claim 3 wherein the first function is a relative difference of the first and second speed signals.

5. The method of claim 4 wherein the relative speed difference is the absolute value of the difference between the second speed signal and the arithmetic average of the first speed signal and a third speed signal representative of the speed of a second wheel on the front axle, divided by a vehicle speed reference.

6. The method of claim 4 wherein the statistic is a second function of a count of relative speed differences greater than a relative speed threshold based on a plurality of relative speed differences.

7. The method of claim 6 wherein the second function of the count is a ratio of the count divided by a measure of time.

8. The method of claim 7 wherein the measure of time is a measure of the amount of time in an antilock brake system event.

9. The method of claim 8 further comprising a step of filtering the ratio of the count divided by the amount of time in the antilock brake system event.

10. The method of claim 6 wherein the relative speed threshold is determined based on a statistical distribution function of the relative speed difference for the four-wheel drive mode and a statistical distribution function of the relative speed difference for the two-wheel drive mode.

11. The method of claim 10 wherein the statistical distribution functions are approximated by histograms.

12. The method of claim 1 wherein the rejection region consists of values greater than a rejection threshold.

13. The method of claim 1 further comprising the step of modifying an antilock brake control algorithm in response to detecting the incorrect indication.

14. A method for detecting an incorrect indication of four-wheel drive operation of a vehicle, the vehicle having a front axle with two front wheels and a rear axle with two rear wheels, the vehicle capable of both four-wheel drive operation where the front and rear axles are locked together and operation where the front and rear axles are unlocked, the vehicle further having an antilock brake system and means coupled to the antilock brake system for indicating four-wheel drive operation, the method comprising the steps of:

(a) generating a first speed signal representative of a speed of a right wheel on the front axle;

(b) generating a second speed signal representative of a speed of the wheels on the rear axle;

(c) generating a third speed signal representative of a speed of a left wheel on the front axle;

(d) measuring a relative speed difference defined as the absolute value of the difference between the second speed signal and the arithmetic average of the first speed signal and the third speed signal, divided by a vehicle speed reference;

(e) computing a ratio of a count of the relative speed differences greater than a relative speed threshold based on a plurality of relative speed differences divided by a measure of the amount of time in an antilock brake system event; and (f) detecting an incorrect indication that the vehicle is in four-wheel drive operation when the value of the count is greater than a rejection threshold and the measure of the amount of time in an antilock brake system event is greater than a time threshold.

15. A system for detecting an incorrect indication of four-wheel drive operation of a vehicle, the vehicle having a front axle with two front wheels and a rear axle with two rear wheels, the vehicle capable of both four-wheel drive operation where the front and rear axles are locked together and operation where the front and rear axles are unlocked, the vehicle further having an antilock brake system and means coupled to the antilock brake system for indicating four-wheel drive operation, the system comprising:

first generating means, coupled to the front wheels, for generating a first speed signal representative of a speed of at least one wheel on the front axle;

second generating means, coupled to the rear wheels, for generating a second speed signal representative of a speed of at least one wheel on the rear axle;

calculating means, operatively associated with the first and second generating means, for calculating a decision value based upon the first and second speed signals; and detection means, operatively associated with the calculating means, for detecting an incorrect indication that the vehicle is in four-wheel drive operation when the decision value is within a rejection region.

16. The system of claim 15 wherein the calculating means comprise:

measuring means, operatively associated with the first and second generating means, for measuring at least one value of a first function of the first and second speed signals; and computing means, operatively associated with the measuring means, for computing the decision value based upon a statistic of the measured value of the first function.

17. The system of claim 16 wherein the first function is a relative difference of the first and second speed signals.

18. The system of claim 17 wherein the relative speed difference is the absolute value of the difference between the second speed signal and the arithmetic average of the first speed signal and a third speed signal representative of the speed of a second wheel on the front axle, divided by a vehicle speed reference.

19. The system of claim 17 wherein the statistic is a second function of a count of relative speed differences greater than a relative speed threshold based on a plurality of relative speed differences.

20. The system of claim 19 wherein the second function of the count is a ratio of the count divided by a measure of time.

21. The system of claim 20 wherein the measure of time is a measure of the amount of time in an antilock brake system event.

22. The system of claim 21 further comprising filtering means, operatively associated with the computing means, for filtering the ratio of the count divided by the amount of time in the antilock brake system event.

23. The system of claim 19 wherein the relative speed threshold is determined based on a statistical distribution function of the relative speed difference for the four-wheel drive mode and a statistical distribution function of the relative speed difference for the two-wheel drive mode.

24. The system of claim 23 wherein the statistical distribution functions are approximated by histograms.

25. The system of claim 15 wherein the rejection region consists of values greater than a rejection threshold.

26. The system of claim 15 further comprising control means, operatively associated with the detecting means and coupled to the antilock brake system, for modifying an antilock brake control algorithm in response to detecting the incorrect indication.

27. A system for detecting an incorrect indication of four-wheel drive operation of a vehicle, the vehicle having a front axle with two front wheels and a rear axle with two rear wheels, the vehicle capable of both four-wheel drive operation where the front and rear axles are locked together and operation where the front and rear axles are unlocked, the vehicle further having an antilock brake system and means coupled to the antilock brake system for indicating four-wheel drive operation, the system comprising:

first generating means, coupled to a right wheel on the front axle, for generating a first speed signal representative of a speed of the right wheel on the front axle;

second generating means, coupled to the wheels on the rear axle, for generating a second speed signal representative of a speed of the wheels on the rear axle;

third generating means, coupled to a left wheel on the front axle, for generating a third speed signal representative of a speed of the left wheel on the front axle;

measuring means, operatively associated with the first, second, and third generating means, for measuring a relative speed difference defined as the absolute value of the difference between the second speed signal and the arithmetic average of the first speed signal and the third speed signal, divided by a vehicle speed reference;

computing means, operatively associated with the measuring means, for computing a ratio of a count of the relative speed differences greater than a relative speed threshold based on a plurality of relative speed differences, divided by a measure of the amount of time in an antilock brake system event; and detecting means, operatively associated with the computing means, for detecting an incorrect indication that the vehicle is in four-wheel drive operation when the value of the count is greater than a rejection threshold and the measure of the amount of time in an antilock brake system event is greater than a time threshold.

* * * * *